(12) United States Patent
Kaya et al.

(10) Patent No.: US 7,962,257 B2
(45) Date of Patent: Jun. 14, 2011

(54) POWER OUTPUT DEVICE, CONTROL METHOD FOR THE SAME, AND VEHICLE EQUIPPED THEREWITH

(75) Inventors: Yasuhiro Kaya, Toyota (JP); Kiyoshiro Ueoka, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 992 days.

(21) Appl. No.: 11/883,023

(22) PCT Filed: Feb. 22, 2006

(86) PCT No.: PCT/IB2006/000359
§ 371 (c)(1),
(2), (4) Date: Jul. 25, 2007

(87) PCT Pub. No.: WO2006/103501
PCT Pub. Date: Oct. 5, 2006

(65) Prior Publication Data
US 2008/0119319 A1    May 22, 2008

(30) Foreign Application Priority Data

Feb. 23, 2005 (JP) ................................ 2005-047016

(51) Int. Cl.
*B60L 11/14* (2006.01)
*B60K 6/04* (2006.01)
*G06F 19/00* (2006.01)

(52) U.S. Cl. ........................ 701/22; 701/51; 180/65.265

(58) Field of Classification Search .................... 701/22, 701/51; 180/65.265, 65.275
See application file for complete search history.

(56) References Cited

U.S. PATENT DOCUMENTS

| 5,865,263 A | * | 2/1999 | Yamaguchi et al. ..... 180/65.235 |
| 6,330,498 B2 | * | 12/2001 | Tamagawa et al. ............. 701/22 |
| 7,040,433 B2 | * | 5/2006 | Yamamoto et al. ...... 180/65.225 |
| 2001/0008859 A1 | | 7/2001 | Masaki |
| 2002/0041167 A1 | | 4/2002 | Kitano et al. |
| 2004/0077448 A1 | | 4/2004 | Oshidari et al. |

FOREIGN PATENT DOCUMENTS

| CN | 1220216 A | 6/1999 |
| CN | 1226496 A | 8/1999 |
| EP | 0 838 359 A2 | 4/1998 |

(Continued)

*Primary Examiner* — Tan Q Nguyen
(74) *Attorney, Agent, or Firm* — Oliff & Berridge, PLC

(57) ABSTRACT

In a vehicle, it is determined whether a driver has requested increased driving force based on an accelerator opening degree. If the driver has requested increased driving force, a vehicle speed at the time of the request for increased driving force is derived. Three-dimensional map which corresponds to different vehicle speed and which shows a predetermined relationship of the accelerator opening degree (Acc), the vehicle speed and a required torque are then used to set the required torque. The maps are set such that the required torque increases with respect to the accelerator opening degree when the vehicle speed is low. Further, the maps are set such that when the vehicle speed is high, (i) even if the accelerator opening degree changes a little, the required driving force does not change a large amount, and (ii) the required driving force remains substantially constant when the vehicle speed is in a high speed region. By adopting this configuration, the driver's request is closely correlated with the vehicle speed at the time of the request for increased driving force, and thus the vehicle can be driven with a driving force that accords with the driver's request.

14 Claims, 8 Drawing Sheets

FOREIGN PATENT DOCUMENTS

| | | |
|---|---|---|
| EP | 0 919 423 A2 | 6/1999 |
| EP | 0 962 352 A2 | 12/1999 |
| EP | 1 279 545 A2 | 1/2003 |
| EP | 1 396 369 A2 | 3/2004 |
| EP | 1 433 641 A1 | 6/2004 |
| JP | A-8-196005 | 7/1996 |
| JP | A-8-218919 | 8/1996 |
| JP | A 9-308012 | 11/1997 |
| JP | A 11-343891 | 12/1999 |
| JP | A-2000-272380 | 10/2000 |
| JP | A 2003-312293 | 11/2003 |
| JP | A-2004-76724 | 3/2004 |
| JP | A-2005-45861 | 2/2005 |

* cited by examiner

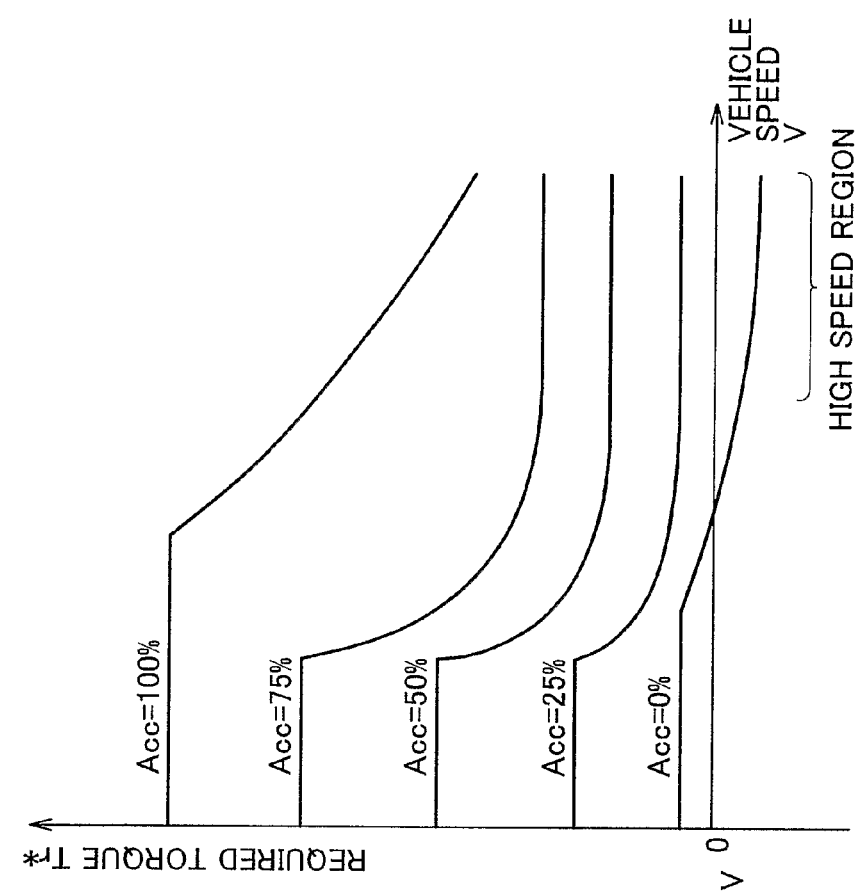
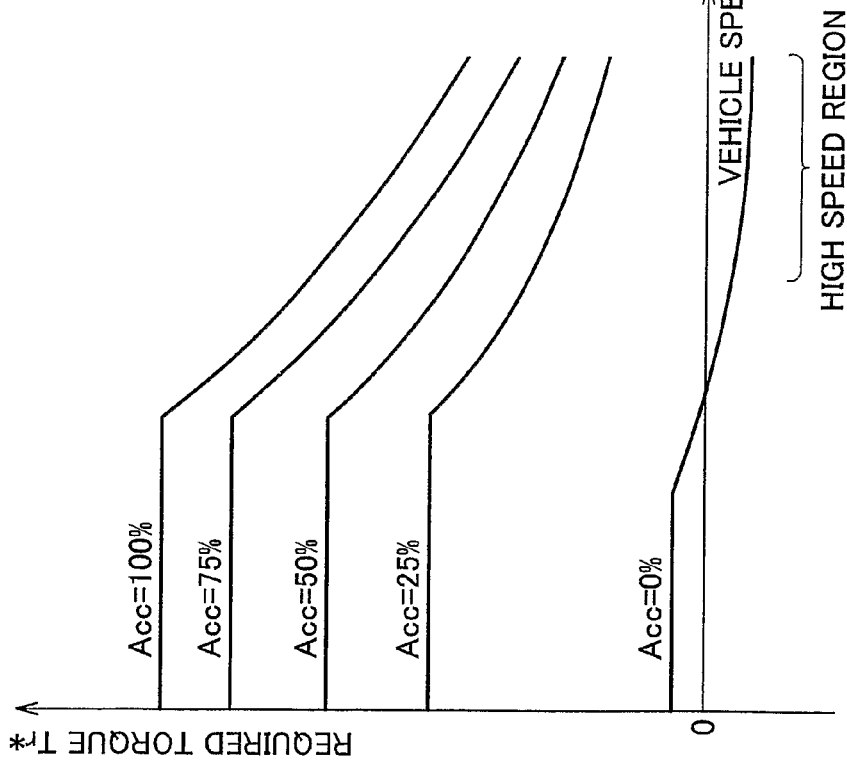

POWER OUTPUT DEVICE, CONTROL METHOD FOR THE SAME, AND VEHICLE EQUIPPED THEREWITH

INCORPORATION BY REFERENCE

The disclosure of Japanese Patent Application No. 2005-047016 filed on Feb. 23, 2005, including the specification, drawings and abstract in incorporated herein by reference in its entirety.

BACKGROUND OF THE INVENTION

1. Field of the Invention

The invention relates to a power output device, a method for controlling the device, and a vehicle that is equipped with the device.

2. Description of the Related Art

Power output devices have been proposed in which an engine, a generator and a motor are controlled to output a required driving force to a drive shaft. In such devices, the depression amount of the accelerator pedal operated by the driver and the present vehicle speed are detected, and used to calculate the required driving force. An example of this type of device is described in Japanese Patent Application Publication No. JP-A 11-343891.

In the device described in JP-A 11-343891, the required driving force is set based on the depression amount of the accelerator pedal and the vehicle speed. However, as a result of setting the required driving force in this manner, there are some situations (described in more detail below) when the output driving force does not meet with the driver's request, or in other words, when the driver does not obtain the driving force he/she want as a result of depressing the accelerator pedal. More specifically, the driving force that a driver wishes to obtain when depressing the accelerator pedal varies depending on the speed at which the vehicle is moving. For example, when the vehicle is traveling at a low speed and the driver wants to accelerate forward quickly, he/she will wish to obtain a rapid increase in driving force by just depressing the accelerator pedal lightly. Alternatively, when the vehicle is traveling at a high speed and cruising, the driver will want to maintain the vehicle's speed with a stable driving force, without having to delicately and constantly adjust depression of the accelerator pedal. Furthermore, when the vehicle is traveling at a high speed and the driver wishes to pass a vehicle in front, he/she will want to obtain a rapid increase in driving force without having to depress the accelerator pedal forcefully beyond its present position. However, devices like that described in JP-A 11-343891 do not take into consideration the driver's request when setting the required driving force, and thus are not able to respond effectively in situations like those described above.

SUMMARY OF THE INVENTION

In light of the above problems, one aspect of the invention provides a drive output device that can output driving force, as far as possible, in accordance with a driver's request. In addition, a control method for controlling the power output device and a vehicle equipped with the device is also provided.

The power output device of the aspect outputs driving force from a power source to a drive shaft, and includes an accelerator opening degree detector, a vehicle speed detector, a controller. The accelerator opening degree detector detects an accelerator opening degree of an accelerator operated by a driver, and the vehicle speed detector detects a vehicle speed. The controller determines whether the driver has requested increased driving force based on the accelerator opening degree detected by the accelerator opening degree detector. When the driver has requested increased driving force, the controller derives a vehicle speed at the time of the request for increased driving force, and sets a required driving force based on the derived vehicle speed at the time of the request for increased driving force, the present accelerator opening degree, and the present vehicle speed. The controller controls the power source based on the set required driving force.

In the above power output device, when it is determined that the driver has requested increased driving force based on the accelerator opening degree, the vehicle speed at the time of the request for increased driving force is derived. The required driving force is then set based on the vehicle speed at the time of the request for increased driving force, the present accelerator opening degree, and the present vehicle speed. Following this, the power source is controlled based on the set required driving force such that the driving force is output from the drive shaft. With this configuration, the driver's request is closely correlated with the vehicle speed at the time when the driver requests increased driving force. As a result, the vehicle is driven with a driving force that corresponds to the vehicle speed at the time when the request for increased driving force is made. Accordingly, it is possible to output driving force, as far as possible, in accordance with the driver's request.

In the power output device according to the aspect, when the required driving force is set, the controller may set the required driving force using a predetermined three-dimensional relationship of the accelerator opening degree, the vehicle speed, and the required driving force. This three-dimensional relationship corresponds to the vehicle speed at the time of the request for increased driving force. In addition, when there is a request for increased driving force, the controller may switch from the presently used three-dimensional relationship to a three-dimensional relationship corresponding to the vehicle speed at the time of the request for increased driving force. Adoption of this configuration enables the three-dimensional relationship to be switched when the driver requests a change in the driving force of the vehicle. As a result of switching the utilized three-dimensional relationship in this manner, the driver is inhibited from feeling any sense of confusion or frustration due to not obtaining the driving force that he/she wants as a result of depressing the accelerator pedal.

In the power output device according to the aspect, the controller may determine that the driver has requested increased driving force when a change amount of the accelerator opening degree is equal to or more than a predetermined setting requirement change amount. With this configuration, the change amount of the accelerator opening degree is used to determine whether the driver has requested increased driving force. Alternatively, the power output device of the aspect may be configured such that the controller determines that the driver has requested increased driving force when the accelerator opening degree has increased from substantially zero. This configuration makes it possible to determine whether the driver has requested increased driving force in a comparatively simple manner.

In the power output device according to the aspect, when the required driving force is set, the controller may set the required driving force larger with respect to the same accelerator opening degree when the vehicle speed is low at the time of the request for increased driving force, as compared to when the vehicle speed is high at the time of the request for increased driving force. With this configuration, when the vehicle speed is low at the time of the request for increased driving force, namely, when the driver wishes to accelerate from a low speed, the required driving force is set to be large. Accordingly, the driver's request for acceleration can be satisfied.

In the power output device according to the aspect, when the required driving force is set, the controller may set the required driving force such that, when the vehicle speed is high at the time of the request for increased driving force, the required driving force changes less with respect to change of the accelerator opening degree in a high speed region. With this configuration, even if the accelerator opening degree changes a little in the high speed region when the vehicle speed is high at the time of the request for increased driving force, the required driving force does not change a large amount. Thus, stable driving force can be obtained in the high speed region.

In the power output device according to the aspect, when the required driving force is set, controller may set the required driving force such that, when the vehicle speed is high at the time of the request for increased driving force as compared to when the vehicle speed is low at the time of the request for increased driving force, the required driving force is substantially constant with respect to the same accelerator opening degree in the high speed region. With this configuration, the required driving force is set to be substantially constant when the vehicle speed is high at the time of the request for increased driving force and the present vehicle speed is high. Accordingly, even if the driver accelerates the vehicle to a higher speed, a constant required driving force is output to the drive shaft by the same accelerator opening degree. Thus, the driver can obtain an adequate sense of acceleration at high speed.

In the power output device according to the aspect, the power source may be an internal combustion engine that outputs power to an output shaft. Further, the power output device may further include speed change/transmission device that is connected to the output shaft. This speed change/transmission device changes the rotation speed of the output of power from the output shaft in accordance with change in a continuously variable gear ratio, and transmits the power to the drive shaft of a vehicle wheel. In this configuration, the controller may control the internal combustion engine and the speed change/transmission device based on the set required driving force.

The power output device according to the aspect may be configured to include, as power sources that output power to the drive shaft, an internal combustion engine and a motor that can selectively input power to the drive shaft and output power from the drive shaft. The power output device may further include power input-output device that is connected to the output shaft and a drive shaft of a vehicle wheel. This power input-output device may output at least a part of the power output from the internal combustion engine to the drive shaft. In this configuration, the controller may control the internal combustion engine, the power input-output device and the motor based on the set required driving force. In addition, the power input-output device may include a three-shaft power input-output device and a generator. The three shafts of the three shaft power input-output device are connected to three other shafts, which are the output shaft of the internal combustion engine, the drive shaft, and a third rotating shaft. Further, the three shaft power-input output device may selectively transfer power between any two of the three shafts and the remaining shaft such that the two shafts input power when the remaining shaft outputs power or the two shafts output power when the remaining shaft inputs power. The generator provided in the power input-output device inputs/outputs power to/from the third rotating element. With this configuration, the controller controls the internal combustion engine, the generator and the motor based on the set required driving force. Alternatively, the power input-output device may be a two-rotor motor provided with a first rotor connected to the output shaft of the internal combustion engine and a second rotor connected to the drive shaft. The two-rotor motor transfers electric power generated by the electromagnetic effect of the first rotating element and the second rotating element, and output at least a part of the power from the internal combustion engine to the drive shaft.

A vehicle according to the aspect is equipped with any one of the power output devices described above. The power output device according to the aspect is able to drive the vehicle with a driving force that accords with the vehicle speed at the time when the driver requests increased driving force. Accordingly, the vehicle equipped with the device is able to achieve the same effects as the device.

The aspect also provides the control method for controlling the power output device that outputs driving force from a power source to a drive shaft. In this method, it is determined whether a driver has requested increased driving force based on an accelerator opening degree, and a vehicle speed is detected. When the driver has requested increased driving force, a vehicle speed at the time of the request for increased driving force is derived. Then, a required driving force is set based on the derived vehicle speed at the time of the request for increased driving force, the present accelerator opening degree, and the present vehicle speed. The power source is then controlled based on the set required driving force.

In the control method for the power output device, the power source is controlled to output driving force from the drive shaft based on the set required driving force that is obtained by performing the above described determining, deriving and setting steps. Accordingly, the driver's request is closely correlated with the vehicle speed at the time when the request for increased driving force is made. As a result, the vehicle is driven with a driving force that accords with the vehicle speed at the time of the request for increased driving force, which makes it possible to output driving force, as far as possible, in accordance with the driver's request. Note that, the control method for the power output device may be utilized with any of the above described forms of the power output device. Furthermore, the control method may include additional steps that promote the functions of the power output device.

BRIEF DESCRIPTION OF THE DRAWINGS

The features, advantages thereof, and technical and industrial significance of this invention will be better understood by reading the following detailed description of a preferred embodiment and various modified forms of the invention, when considered in connection with the accompanying drawings, in which:

FIG. 4A and FIG. 4B are illustrative diagrams showing some more specific examples of the required torque setting maps according to the embodiment;

DETAILED DESCRIPTION OF THE PREFERRED EMBODIMENTS

In the following description and the accompanying drawings, the present invention will be described in more detail in terms of a specific embodiment.

Figure 1:
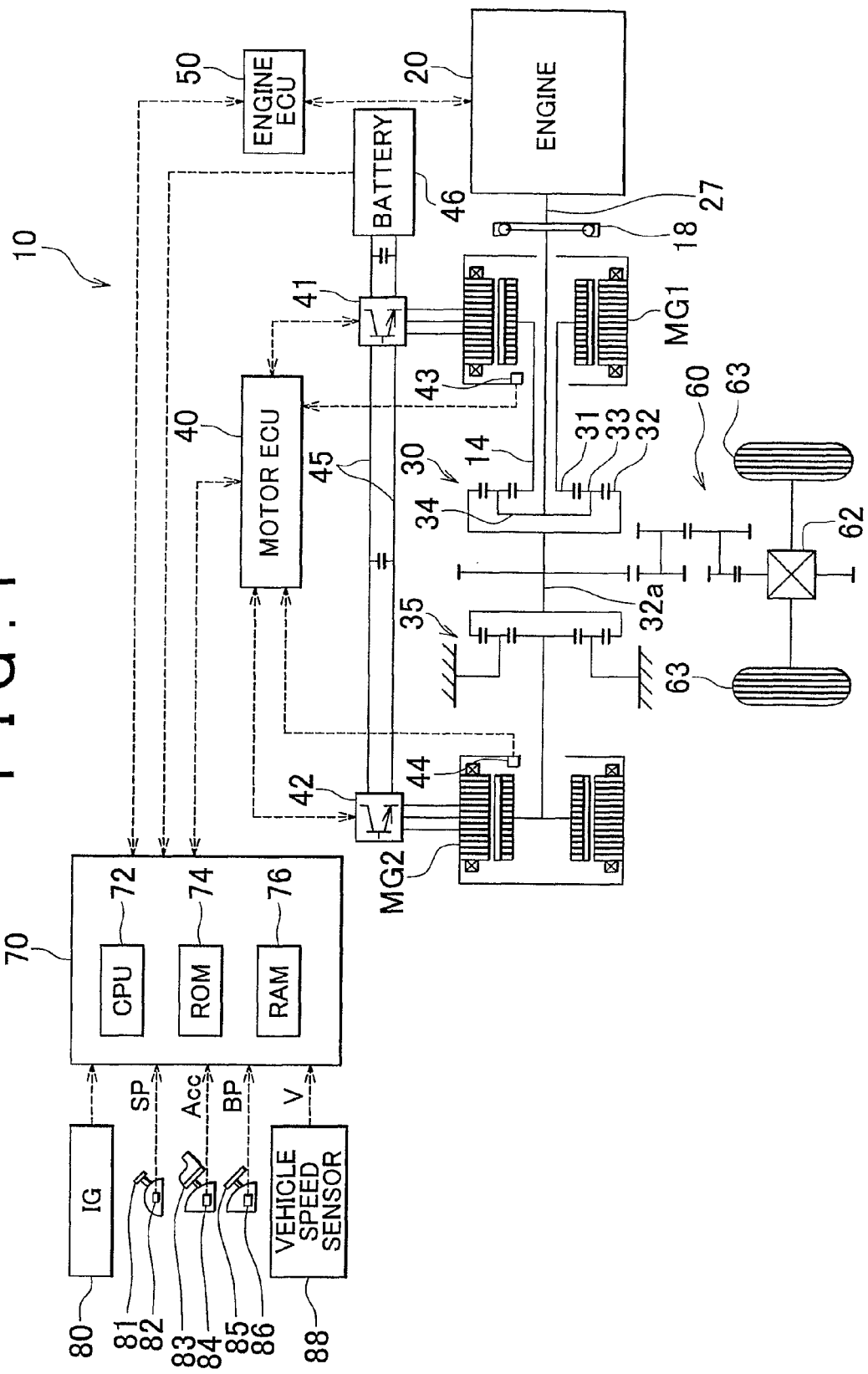
FIG. 1 shows an outline of the structure of a hybrid vehicle according to the embodiment.

FIG. 1 shows an outline of the structure of a hybrid vehicle 10 according to the embodiment of the invention. As can be seen from FIG. 1, the hybrid vehicle 10 includes an engine 20, an engine electronic control unit (engine ECU) 50 that controls the overall engine system, a power distribution/integration mechanism 30, a motor MG 1, a reduction gear 35, a motor MG 2, and a hybrid electronic control unit (hybrid ECU) 70 that controls the overall power output device. The power distribution/integration mechanism 30 has three shafts and is connected to a crankshaft 27 that is the output shaft of the engine 20 via a damper 18. The motor MG 1 is connected to the power distribution/integration mechanism 30 and can generate power. The reduction gear 35 is attached to a ring gear shaft 32a that is connected to the power distribution/integration mechanism 30 and that functions as a drive shaft. The motor MG 2 is connected to the reduction gear 35

The engine 20 is an internal combustion engine that outputs power by combusting a hydrocarbon fuel like gasoline or light oil. The engine ECU 50 receives signals from various sensors that detect the operating state of the engine 20, and performs a variety of operation controls for the engine 20. These operation controls include fuel injection control, ignition control, and intake air amount adjustment control. The engine ECU 50 communicates with the hybrid ECU 70 and performs operation control of the engine 20 based on control signals from the hybrid ECU 70. In addition, the engine ECU 50 outputs data concerning the operating state of the engine 20 to the hybrid ECU 70 when required.

The power distribution/integration mechanism 30 is a planetary gear mechanism that includes various rotating elements and also functions as a differential mechanism. The rotating elements of the planetary gear mechanism include (i) a sun gear 31 connected to the motor MG 1, (ii) a ring gear 32 connected to the motor MG 2, (iii) a plurality of pinion gears 33 meshed with the sun gear 31 and the ring gear 32, and (iv) a carrier 34, connected to the crankshaft 27 of the engine 20, that holds the pinion gears 33 such that the pinion gears 33 are capable of both rotation and revolution. The power distribution/integration mechanism 30 is configured such that the carrier 34 is coupled to the crankshaft 27 of the engine 20, the sun gear 31 is coupled to a rotating shaft 14 of the motor MG 1, and the ring gear 32 is coupled to the reduction gear 35 via a ring gear shaft 32a. When the motor MG 1 functions as a generator, the power distribution/integration mechanism 30 distributes power from the engine 20, which is input from the carrier 34, to the sun gear 31 and the ring gear 32 in accordance with the gear ratio. On the other hand, when the motor MG 1 functions as a motor, the power distribution/integration mechanism 30 integrates (a) the power from the engine 20 which is input from the carrier 34 and (b) the power from the motor MG 1 that is input from the sun gear 31. The power distribution/integration mechanism 30 then outputs the integrated power to the ring gear 32. The power output to the ring gear 32 is transmitted from the ring gear shaft 32a to a gear mechanism 60, and then to a differential gear 62. Finally, the power is output to driven wheels 63, 63 of the vehicle.

The motor MG 1 and the motor MG 2 are synchronous generator-motors of a known type and can operate as either generators or motors. The motors MG 1 and MG 2 are connected to a battery 46 via a power line 45 that connects inverters 41 and 42. Electric power can be transferred between the motors MG 1 and MG 2 and the battery 46 via the power line 45. Drive of the motors MG 1 and MG 2 is controlled by a motor electronic control unit (motor ECU) 40 that receives signals from respective rotational position detection sensors 43 and 44. The motor ECU 40 also outputs switching control signals to the inverters 41 and 42. The motor ECU 40 and the engine ECU 50 described above correspond to control means of the invention. Note that, a detailed explanation of the structure of the output shaft of the power distribution/integration mechanism 30 and the control of the motors MG 1 and MG 2 will not be given here. An explanation of these matters can be found in, for example, Japanese Patent Application Publication No. JP-A 9-308012.

The hybrid ECU 70 is configured from a microprocessor including a CPU 72 as a main element. The hybrid ECU 70 also includes a ROM 74 that stores processing programs, a RAM 76 that temporarily stores data, an input port, and an output port (not shown). Various signals are input to the input port of the hybrid ECU 70. These signals include the ignition signal from an ignition switch 80; the shift position SP signal from a shift position sensor 82 that detects an operation position of the shift lever 81; the accelerator opening degree Acc signal from an accelerator pedal position sensor 84 (corresponding to accelerator opening degree detection means) that detects the depression amount of an accelerator pedal 83; the brake pedal position BP signal from a brake pedal position sensor 86 that detects the depression amount of a brake pedal 85; and the vehicle speed V signal from a vehicle speed sensor 88 (corresponding to vehicle speed detecting means). The hybrid ECU 70 exchanges various control signals and data with the engine ECU 50 and the motor ECU 40. Note that, a current sensor, not shown, detects the charge/discharge current of the battery 46, and the hybrid ECU 70 calculates a remaining charge SOC of the battery 46 using an integer of the detected charge/discharge current. The hybrid ECU 70 corresponds to required driving force setting means according to the invention.

In the hybrid vehicle 10 according to the embodiment, the hybrid ECU 70 reads the information contained in the various signals including the shift position SP from the shift position sensor 82, the accelerator opening degree Acc from the accelerator pedal position sensor 84, the brake pedal position BP from the brake pedal position sensor 86, and the vehicle speed V from the vehicle speed sensor 88. This information is used to determine a required torque Tr* (required driving force Tr*) to be output to the ring gear shaft 32a. The hybrid ECU 70 controls the operation of the engine 20, the motor MG 1 and the motor MG 2 so as to efficiently output the power required for driving the vehicle (hereinafter referred to as "drive required power") in accordance with the required torque Tr*.

Figure 2:
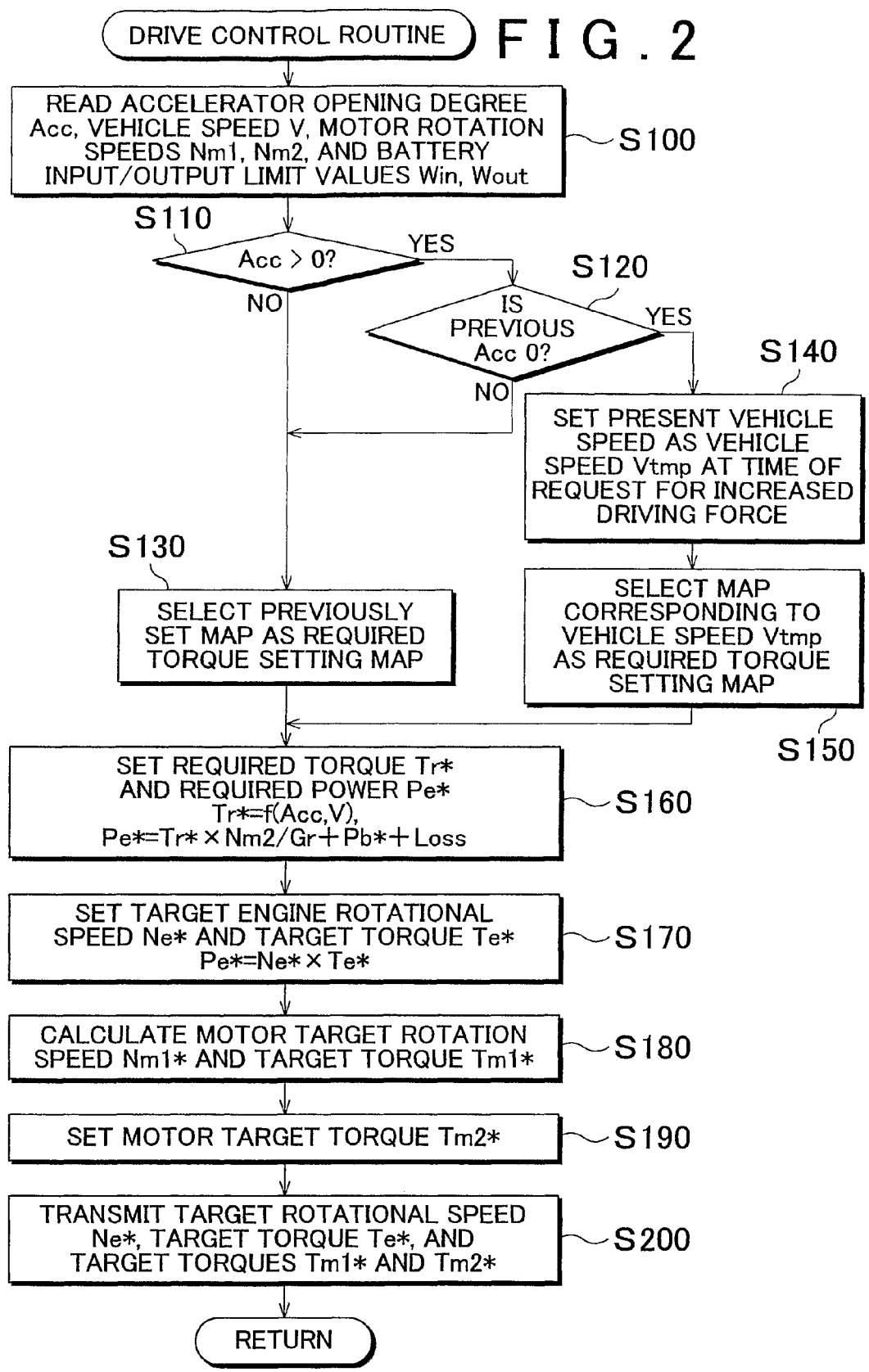
FIG. 2 is a flow chart of a drive control routine according to the embodiment.

Next, the operation of the above described hybrid vehicle 10 will be explained. FIG. 2 is a flow chart showing an example of a drive control routine that is performed by the CPU 72 of the hybrid ECU 70. This routine is stored in the ROM 74 and repeatedly performed within a predetermined time period (for example, every few msec).

In the first step of the process shown in FIG. 2, the CPU 72 reads the signals necessary for performing control of the engine 20 and the motors MG 1 and MG 2, etc. These signals include the accelerator opening degree Acc, the vehicle speed V, a rotation speed Nm1 of the motor MG 1, a rotation speed Nm2 of the motor MG 2, and battery input/output limit values Win, Wout (step S100). The rotation speeds Nm1 and Nm2 of the motors MG 1 and MG 2 read by the CPU 72 are derived from the signals output from the rotational position detection sensors 43 and 44. Further, the input/output limit values Win and Wout read by the CPU 72 are set based on the temperature and the remaining charge (SOC) of the battery 46. Next, the CPU 72 determines whether the accelerator opening degree Acc is more than zero (step S110). If the accelerator opening degree Acc is more than zero, it is determined whether the previous accelerator opening degree Acc was zero or not (step S120), using a value for the previous accelerator opening degree Acc that is pre-stored in the RAM 76. When the previous accelerator opening degree Acc is zero, the CPU 72 determines that the fact that the present accelerator opening degree Acc has increased from zero indicates that the driver has requested increased driving force (hereinafter referred to as a "request for increased driving force") by depressing the accelerator pedal 83. In response, the CPU 72 sets the present vehicle speed obtained from the signal from the vehicle speed sensor 88 as a vehicle speed Vtmp at the time of the request for increased driving force (step S140). Further, the CPU 72 selects a map that corresponds to the vehicle speed Vtmp from a plurality of required torque setting maps that are pre-stored in the ROM 74 (step S150).

Figure 3:
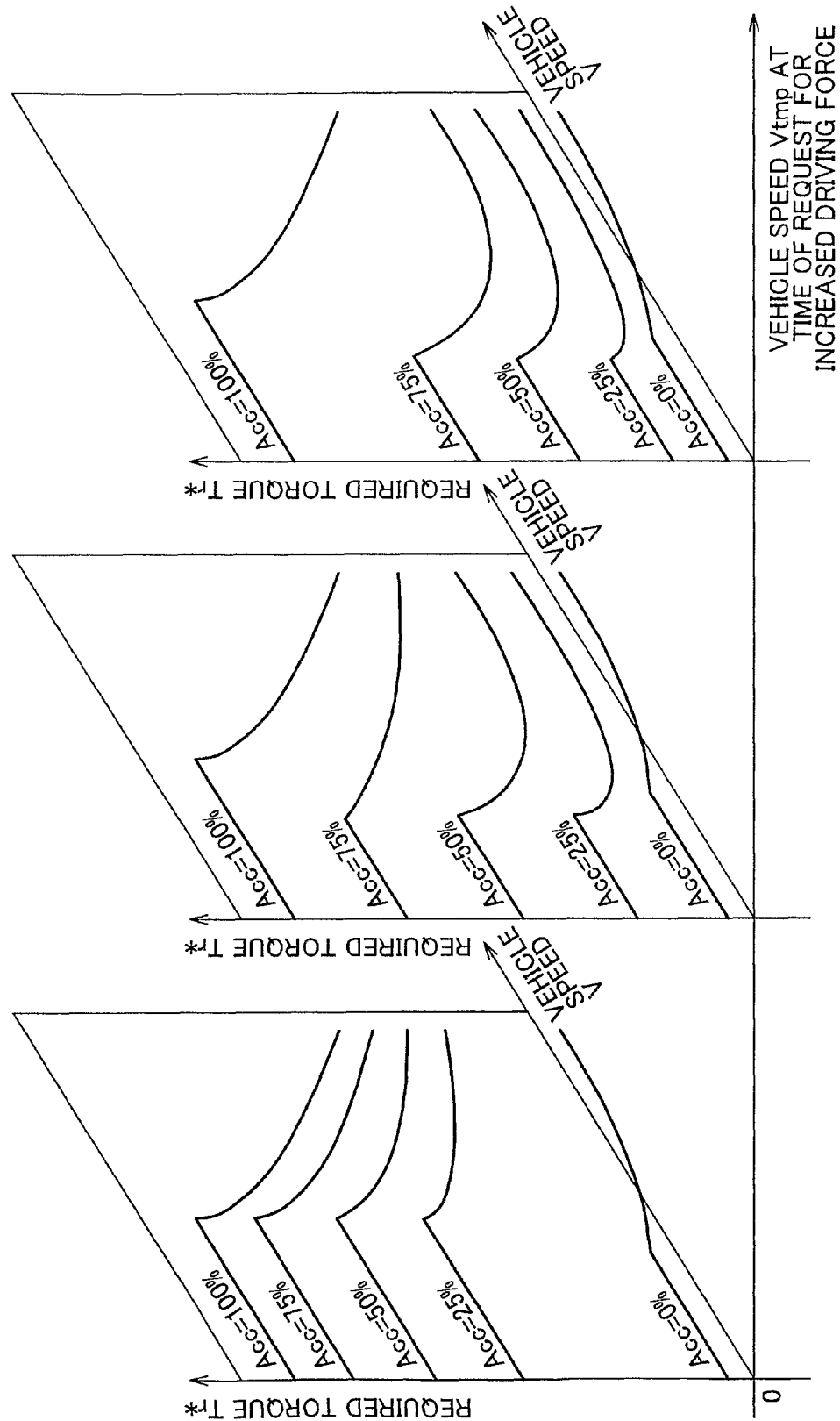
FIG. 3 is a conceptual diagram showing required torque setting maps according to the embodiment.

Next, the required torque setting maps stored in the ROM 74 will be described. FIG. 3 is a conceptual diagram showing the required torque setting maps according to the embodiment, and FIG. 4A and FIG. 4B are illustrative diagrams that shows some more specific examples of the required torque setting maps according to the embodiment. Specifically, FIG. 4A is a map for when the vehicle speed Vtmp is zero, and FIG. 4B is a map for when the vehicle speed Vtmp is comparatively high. These maps are used to set the required torque Tr* that is output from the ring gear shaft 32a. As is apparent from FIG. 3, the maps are 3-dimensional maps that correspond to different vehicle speeds Vtmp at the time of a request for increased driving force. The maps show a determined relationship between the accelerator opening degree Acc, the vehicle speed V, and the required torque Tr*. Note that, due to limitation of space, FIG. 3 only shows three example maps corresponding to different vehicle speeds Vtmp.

As can be seen by comparing FIG. 4A with FIG. 4B, the maps are set such that the required torque Tr* is generally greater with respect to the same accelerator opening degree Acc when the vehicle speed Vtmp is low, than when the vehicle speed Vtmp is high. Accordingly, if the driver wants to accelerate when the vehicle speed is low, the required torque Tr* that is set as a result of depressing the accelerator pedal is large. In other words, the map of FIG. 4A is set to meet the driver's request for increased acceleration when the vehicle speed Vtmp is near zero. Further, the required torque setting map for when the vehicle speed Vtmp is high (FIG. 4B) is set such that the required torque Tr* generally changes a small amount with respect to changes in the accelerator opening degree Acc in a high speed region when the accelerator opening degree is varied between substantially 0% and 75%. Note that, in the high speed region when the vehicle is cruising and the required torque Tr* is low (for example, the high speed region where the accelerator opening degree Acc is 25% or less shown in FIG. 4B), the map is set such that even if the driver changes the accelerator opening degree Acc a little, the required torque Tr* does not change a large amount. In addition, when the vehicle speed Vtmp is high (FIG. 4B), as compared to when the vehicle speed Vtmp is low (refer to FIG. 4A), the required torque Tr* is set to be constant for the same accelerator opening degree Acc in the high speed region. Accordingly, with the map of FIG. 4A, if the driver has accelerated to a higher vehicle speed V, it is necessary for the driver to increase the accelerator opening degree Acc in order to hold the required torque Tr* at a constant level. However, the map of FIG. 4B is set such that, even if the driver has accelerated to a higher vehicle speed V, the same accelerator opening degree Acc causes a constant driving force to be output from the drive shaft. In other words, the map of FIG. 4B is set to meet with the requirements of a driver when (i) he/she is cruising at a high speed and wishes to maintain a constant driving force, and (ii) he/she is driving at a high speed and wants to accelerate to pass another vehicle or the like. As a result of configuring the required torque setting maps in the above described manner, it is possible to set the required torque Tr* in accordance with the present accelerator opening degree Acc and the present vehicle speed V, and in addition also take into account the vehicle speed Vtmp at the time of a request for increased driving force.

Next, the explanation of FIG. 2 will be continued. In step S120, when the previous accelerator opening degree Acc is not zero, or, when the accelerator opening degree Acc in step S110 is zero, the CPU 72 selects the required torque setting map used in the previous processing cycle as the required torque setting map (step S130). In other words, when the driver has not requested an increase in acceleration, or when the driver has continued depressing the accelerator pedal by the same amount, the presently used map is selected without any change. Note that, in the case that there is no previously used required torque setting map, the required torque setting map is selected by taking the present vehicle speed V as the vehicle speed Vtmp. Accordingly, immediately after system start-up, the ECU 72 selects a vehicle speed Vtmp=0 map, and skips the processing of steps S120 to S150 of the routine.

Next, when the previously set map is selected for the required torque setting map in step S130, or when a map corresponding to the vehicle speed Vtmp is selected as the required torque setting map in step S150, the CPU 72 uses the selected map to set the required torque (required driving force) Tr* that needs to be output to the ring gear shaft 32a, and a required engine power Pe* needed by the vehicle (step S160). Note that, the required torque Tr* is derived and set using the selected map as the required torque Tr* that corresponds to the given accelerator opening degree Acc and vehicle speed V. Further, the required engine power Pe* may be calculated as the sum of (i) a drive required power Pr*(=Tr*×Nr) calculated as the product of the set required torque Tr* and a rotation speed Nr of the ring gear shaft 32a (a value that is a multiple of the vehicle speed V and a conversion factor k), (ii) a charge/discharge required power Pb* that is required by the battery 46, and (iii) a loss value Loss. Note that, the rotation speed Nr of the ring gear shaft 32a may be derived by multiplying the vehicle speed V by conversion factor k, or may be derived by dividing the rotation speed Nm2 of the motor MG 2 by a gear ratio Gr of the reduction gear 35. The charge/discharge required power Pb* is basically set such that the SOC of the battery 46 becomes an appropriate value (for example, 60 to 70%).

Figure 5:
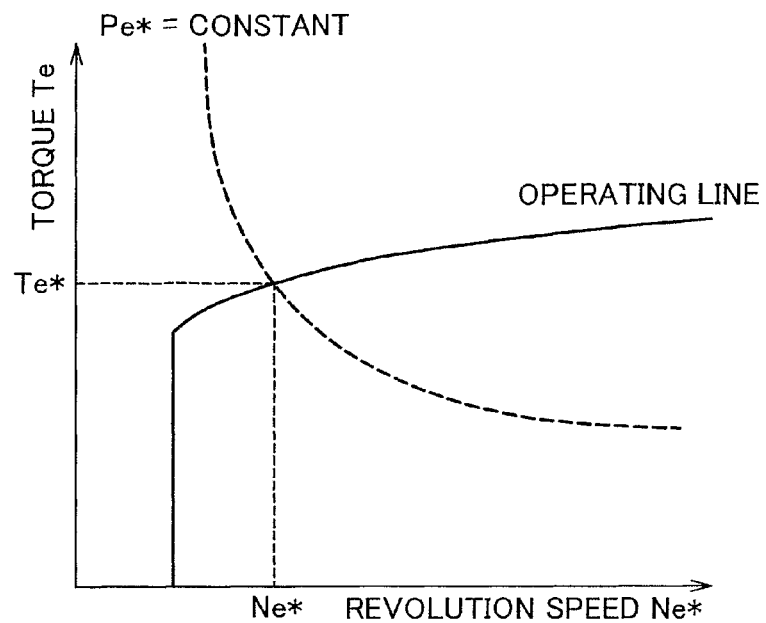
FIG. 5 is an illustrative diagram showing one example of the operation line of an engine, and setting of a target rotational speed Ne and a target torque Te.

Next, the CPU 72 sets a target rotational speed Ne* and a target torque Te* for the engine 20 using the set required engine power Pe* (step S170). At this time, the target rotational speed Ne* and the target torque Te* are set based on an operating line that indicates efficient operation of the engine 20, and the required engine power Pe*. FIG. 5 shows one example of the operating line of the engine 20 and setting of the target rotational speed Ne* and the target torque Te*. As can be seen from the figure, the target rotational speed Ne* and the target torque Te* are derived from the intersection of the operating line and the curve indicating the engine required power Pe*.

Figure 6:
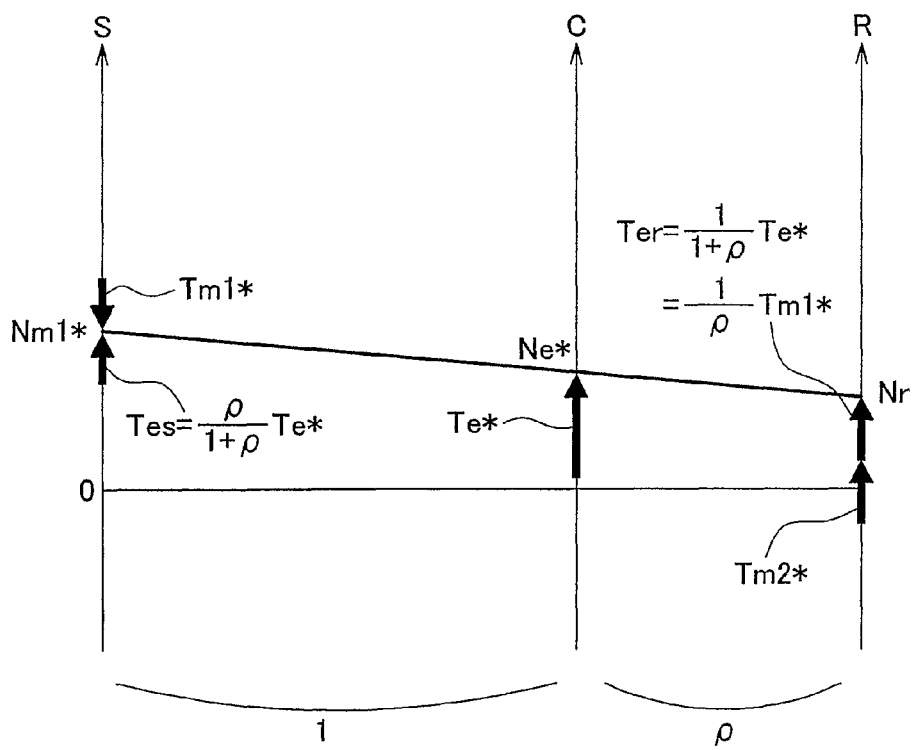
FIG. 6 is an illustrative diagram showing an example of an alignment chart that explains the dynamics of rotating elements of a power distribution/integration mechanism.

Next, in step S180, Expression (1) is used to set a target rotation speed Nm1* of the motor MG 1 using the target rotational speed Ne* of the engine 20, the rotation speed Nr (Nm2/Gr) of the ring gear shaft 32$a$, and a gear ratio ρ (i.e., the teeth number of the sun gear 31/the teeth number of the ring gear 32) of the power distribution/integration mechanism 30. Further, in step S180, Expression (2) is used to set the target torque Tm1* of the motor MG 1 using the set target rotational speed Nm1* and the present rotation speed Nm1. Expression (1) is an expression that indicates the dynamic relationship of the rotating elements of the power distribution/integration mechanism 30. FIG. 6 is an alignment chart that explains the dynamic relationship of the torque and the rotation speed of the rotating elements of the power distribution/integration mechanism 30. In the figure, the shaft S on the left indicates the rotation speed of the sun gear 31 that is the rotation speed Nm1 of the motor MG 1, the shaft C indicates the rotation speed of the carrier 34 that is the rotational speed Ne of the engine 20, and the shaft R indicates the rotation speed Nr of the ring gear 32. Expression (1) can easily be derived using this alignment chart. The two bold arrows shown on shaft R indicate (i) a torque Ter (=Tm1*/ρ) that is the part of the torque Te* output from engine 20 that is transmitted to the ring gear shaft 32$a$ when the engine 20 is operating steadily at the operating point corresponding to the target rotational speed Ne* and the target torque Te*, and (ii) the torque Tm2 output to the ring gear 32$a$ shaft from the motor MG 2. Further, Expression (2) is an expression showing a relationship used in feedback control that controls the motor MG 1 to rotate at the target rotation speed Nm1*. In Expression (2), "k1" of the second term on the right side is a proportional term gain, and "k2" of the third term on the right side is an integral term gain.

$$Nm1^* = Ne^* \times (1+\rho)/\rho - Nm2/(Gr \times \rho) \quad (1)$$

$$Tm1^* = \text{previous } Tm1^* + k1(Nm1^* - Nm1) + k2 \int (Nm1^* - Nm1)dt \quad (2)$$

Next, the CPU 72 sets the target torque Tm2* of the motor MG 2 (step S190). At this time, the target torque Tm2* is set within the range of the input/output limit values Win, Wout of the battery 46. More specifically, when calculating the target torque Tm2*, torque limits Tmin and Tmax are calculated using Expression (3) and Expression (4), and then a provisional motor torque Tm2tmp is calculated using Expression (5) that uses the required torque Tr*, the target torque Tm1*, and the gear ratio ρ of the power distribution/integration mechanism 30. The provisional motor torque Tm2tmp indicates the torque that needs to be output from the motor MG 2. The provisional motor torque Tm2tmp is set within the constraints of the calculated torque limits Tmin and Tmax. Note that, Expression (5) can easily be derived from the alignment chart shown in FIG. 6.

$$Tmin = (Win - Tm1^* \times Nm1)/Nm2 \quad (3)$$

$$Tmax = (Wout - Tm1^* \times Nm1)/Nm2 \quad (4)$$

$$Tm2tmp = (Tr^* + Tm1^*/\rho)/Gr \quad (5)$$

When the target rotational speed Ne* and the target torque Te* of the engine 20, and the target torques Tm1* and Tm2* of the motors MG 1 and MG 2 have been set, the CPU 72 commands the engine ECU 50 to perform control of the target rotational speed Ne* and the target torque Te* of the engine 20, and commands the motor ECU 40 to perform control of the target torques Tm1* and Tm2* of the motors MG 1 and MG 2 (step S200). Following this, the drive control routine is ended. Upon receiving the command from the CPU 72, the engine ECU 50 performs controls like fuel injection control and ignition control of the engine 20 so that it operates at the operating point indicated by the target rotational speed Ne* and the target torque Te*. Moreover, when the motor ECU 40 receives the command from the CPU 72, the motor ECU 40 performs switching control of the inverters 41 and 42 so that the motor MG 1 is driven based on the target torque Tm1*, and the motor MG 2 is driven based on the target torque Tm2*.

Next, FIG. 4A and FIG. 4B will be used to explain the series of operations in the drive control routine shown in FIG. 2. The explanation given here will focus on an example in which the hybrid vehicle 10 starts running from a stopped state. When the driver depresses the accelerator pedal 83, which is fully released when the vehicle is stopped, the accelerator opening degree Acc increases from zero. Accordingly, the CPU 72 determines that there is a request for increased driving force, sets the present vehicle speed as the vehicle speed Vtmp (in this case, Vtmp=0), and selects the map that corresponds to the vehicle speed Vtmp (refer to FIG. 4A). Next, the required torque Tr* is set based on the present accelerator opening degree Acc and the present vehicle speed V, and the engine 20 and the motors MG 1 and MG 2 are controlled so that the set required torque Tr* is output to the ring gear shaft 32$a$ that functions as the drive shaft. The map used at this time is selected while prioritizing the fact that the driver is accelerating from a vehicle speed V in the vicinity of zero. Accordingly, a large torque is output with respect to the accelerator opening degree Acc, and the vehicle accelerates responsively. Next, the vehicle accelerates up to a comparatively high speed (for example, around 60 km/hour) and cruises at that speed. Then, the driver releases the accelerator pedal 83 in order to adjust acceleration or the like. At this time, as a result of releasing the accelerator pedal 83, the driver's sense of the relationship of the depression amount (i.e., the accelerator opening degree Acc) of the accelerator pedal 83 and the vehicle's feeling of acceleration is, in effect, "lost" or "confused". Following this, when the driver depresses the accelerator pedal 83 again, the accelerator opening degree Acc increases from zero. Accordingly, the CPU 72 determines that there is a request for increased driving force, sets the present vehicle speed as the vehicle speed Vtmp, and switches to the map that corresponds to this vehicle speed Vtmp (refer to FIG. 4B). The required torque Tr* is then set based on the present accelerator opening degree Acc and the present vehicle speed V, and the engine 20 and the motors MG 1 and MG 2 are controlled so that the set required torque Tr* is output to the ring gear shaft 32$a$ that acts as the drive shaft. At this time, if the maps had not been switched, the driver would feel a sense of confusion or frustration because of a lack of vehicle responsiveness. However, because the CPU 72 switches the maps when the vehicle accelerates again, the driver's sense of confusion/frustration is reduced even though his/her sense of the relationship of the vehicle's feeling of acceleration and depression of the accelerator pedal 83 has been lost by releasing the accelerator pedal 83. Following this, the CPU 72 uses the selected map corresponding to the vehicle speed Vtmp to set the required torque Tr* based on the present accelerator opening degree Acc and the vehicle speed V. This map is set such that, when the vehicle is cruising at a constant high speed, even if the driver changes the accelerator opening degree Acc a little, the required torque Tr* does not change a large amount. Accordingly, the driver will not be irritated by having to delicately adjust the depression amount of the accelerator pedal 83 in order to maintain a constant cruising speed. In addition, with this map, as the vehicle speed increases, the torque is set constantly even if the depression amount of the accelerator pedal 83 is not increased. Thus, the driver has the sensation that the vehicle will accelerate forward responsively if he/she depresses the accelerator pedal 83 further. Note that, every time the accelerator opening degree Acc is increased from zero, the CPU 72 controls running of the vehicle based on the selected map that corresponds to the vehicle speed Vtmp.

In the hybrid vehicle 10 according to the embodiment, it is determined whether the driver has made a request for increased driving force based on the accelerator opening degree Acc. Then, when there is a request for increased driving force, the vehicle speed Vtmp at the time of the request for increased driving force is derived, and the required torque Tr* is set based on the derived vehicle speed Vtmp, the present accelerator opening degree Acc, and the present vehicle speed V. The engine 20 and the motors MG 1 and MG 2 are then controlled based on the set required torque Tr*, and driving force is output to the ring gear shaft 32a that serves as the drive shaft. With this configuration, the request of the driver is closely correlated to the vehicle speed Vtmp at the time of the request for increased driving force. Accordingly, the vehicle can be driven with a driving force that corresponds to the vehicle speed Vtmp at the time of the request for increased driving force, and as a result, as far as possible, driving force can be output that accords with the driver's request.

Further, when there is a request for increased driving force, namely, when the driver wants to change the driving force of the vehicle, the presently used required torque setting map is switched. As a result of switching the map in this manner, it is possible to reduce the driver's feeling of confusion or frustration. Moreover, because it is determined that there is a request for increased driving force when the accelerator opening degree Acc is increased from zero, it is comparatively easy to determine when the driver is requesting increased driving force.

In addition, when the vehicle speed Vtmp is low and there is a request for increased driving force, namely, when the driver wants to accelerate from a low speed, a large required torque Tr* is set in response to the depression of the accelerator pedal 83. Accordingly, the driver's request to accelerate forward rapidly can be satisfied. On the other hand, when the vehicle speed Vtmp is high, the required torque Tr* does not change a large amount for a given change in the accelerator opening degree Acc within the high speed region. Thus, the driver can obtain stable driving force without having to delicately adjust the depression amount of the accelerator pedal 83, which can be irritating. Moreover, when the vehicle speed Vtmp is high at the time of a request for increased driving force, and the present vehicle speed V is high, a substantially constant required torque Tr* is set. As a result, even if the driver accelerates the vehicle to a higher speed, a constant required torque Tr* is output from the drive shaft by the same accelerator opening degree Acc.

Note that, the invention is not limited to the above described embodiment, and may be carried out in a variety of different forms and modes that come within the technical scope of the invention.

For example, in the above described embodiment, the required torque setting maps shown in FIGS. 3, 4A and 4B are utilized to set the required torque Tr* based on the vehicle speed Vtmp, the present accelerator opening degree Acc, and the present vehicle speed V. However, instead of using the required torque setting maps, an expression showing the relationship of the vehicle speed Vtmp, the present accelerator opening degree Acc, and the present vehicle speed V may be stored in advance in the ROM 74, and this expression may be used to calculate and derive the required torque Tr*. Of course, with this configuration as well, driving force can be output, as far as possible, in accordance with the driver's request.

Figure 7:
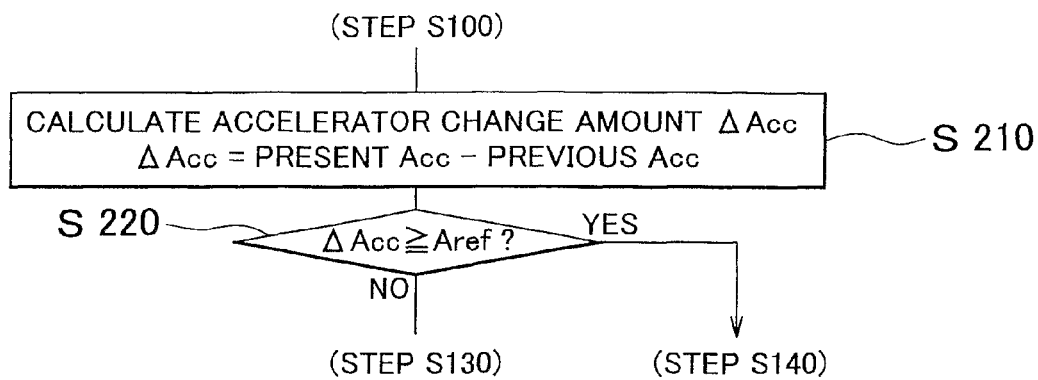
FIG. 7 is a flow chart of another drive control routine.

In the above described embodiment, when the accelerator opening degree Acc increases from zero in steps S110, S120, the required torque setting map that corresponds to the current vehicle speed Vtmp is selected (steps S140, S150). However, instead of using this configuration, it may be determined that the driver desires increased acceleration when a change amount ΔAcc of the accelerator opening degree Acc is equal to or more than a predetermined value (threshold value) Aref. Accordingly, when the change amount ΔAcc is equal to or more than the threshold value Aref, the required torque setting map that corresponds to the current vehicle speed Vtmp is selected. More specifically, as shown in FIG. 7, in the drive control routine of FIG. 2, after step S100, the accelerator change amount ΔAcc is calculated based on the difference between the accelerator opening degree Acc input in step S100, and the accelerator opening degree (previous Acc) input during the previous cycle of the routine (step S210). Then, it is determined whether the calculated accelerator change amount ΔAcc is equal to or more than the threshold value Aref (step S220). Here, the threshold value Aref is a value for determining whether an increase in acceleration has been requested, and may be set, for example, at 20%, 30% or 40%. When the accelerator change amount ΔAcc is equal to or more than the threshold value Aref, it is determined that the driver desires increased acceleration, and step S140 and the following steps of the above drive control routine are performed. However, when the accelerator change amount ΔAcc is below the threshold value Aref, step S130 and the following steps of the drive control routine are performed. With this configuration as well, it is possible to output driving force, as far as possible, in accordance with the driver's request. Moreover, the processing of steps S210 and S220 shown in FIG. 7 may be performed after step S120 of the drive control routine of FIG. 2. If this configuration is adopted, the CPU 72 determines that there is a request for increased driving force when either (i) the accelerator opening degree Acc has increased from zero, and/or (ii) the accelerator change amount ΔAcc has become equal to or more than the threshold value Aref.

Figure 8:
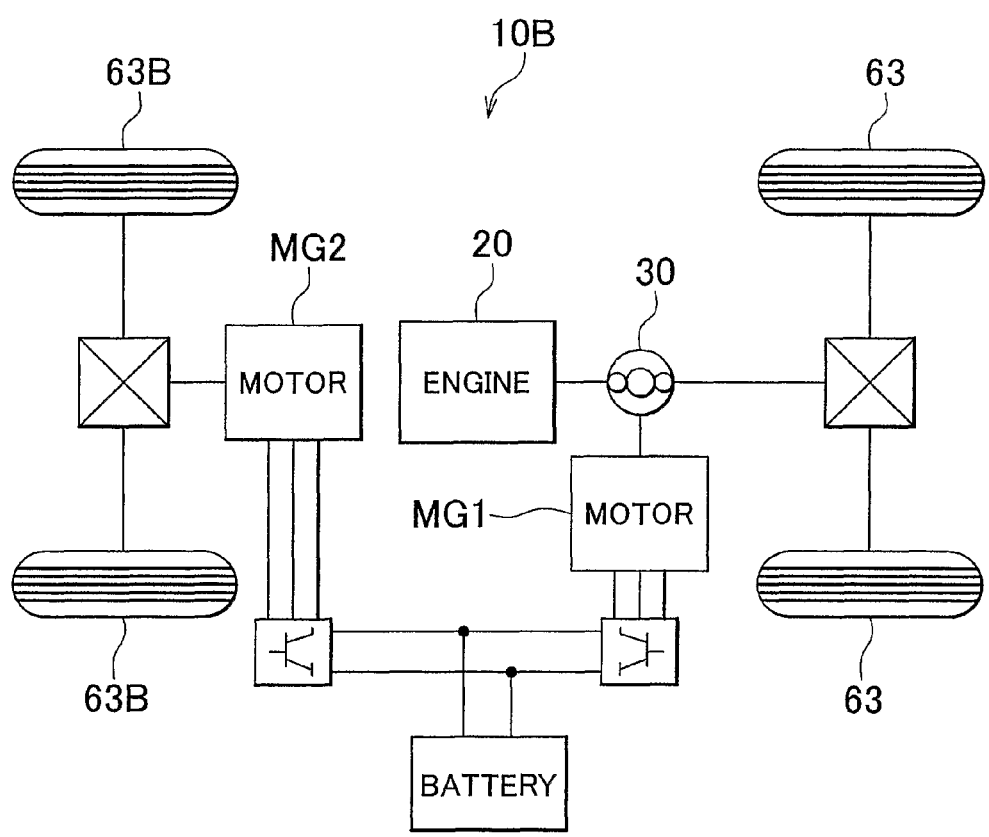
FIG. 8 shows an outline of the structure of another hybrid vehicle.

Moreover, in the above described embodiment, driving force of the motor MG 2 is output to the ring gear 32. However, the output of the motor MG 2 may be directed to a shaft (the shaft of wheels 63B, 63B in FIG. 8) other than the shaft coupled to the ring gear 32 (i.e., the shaft of the driven wheels 63, 63), as in a hybrid vehicle 10B shown in FIG. 8.

Figure 9:
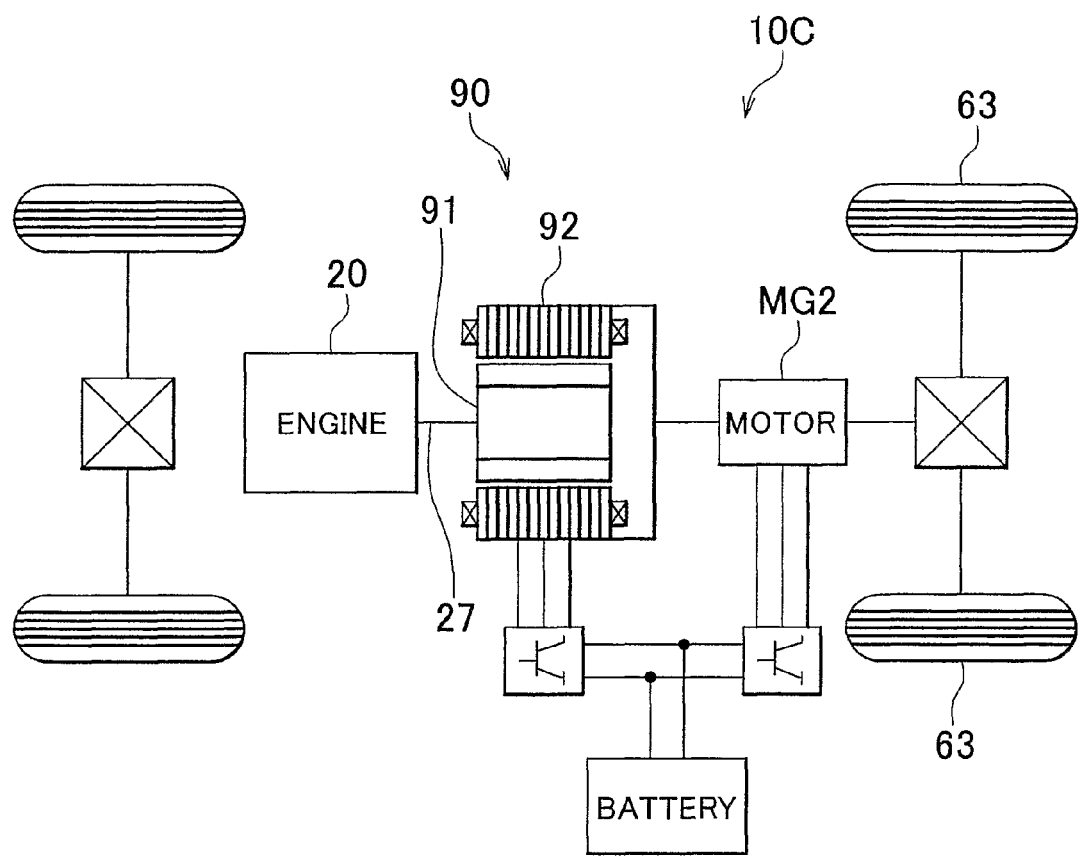
FIG. 9 shows an outline of the structure of yet another hybrid vehicle.

Further, in the above embodiment, output of the engine 20 is output to the ring gear 32 coupled to the driven wheels 63 via the power distribution/integration mechanism 30. However, a configuration like that of a hybrid vehicle 10C shown in FIG. 9 may be adopted instead. In this configuration, a two-rotor motor 90 is provided including an inner rotor 91 connected to the crankshaft 27 of the engine 20 and an outer rotor 92 connected to the drive shaft that outputs driving force to the driven wheels 63 and 63.

The two-rotor motor 90 transmits part of the power of the engine 20 to the drive shaft, and converts the remaining power to electric power.

Figure 10:
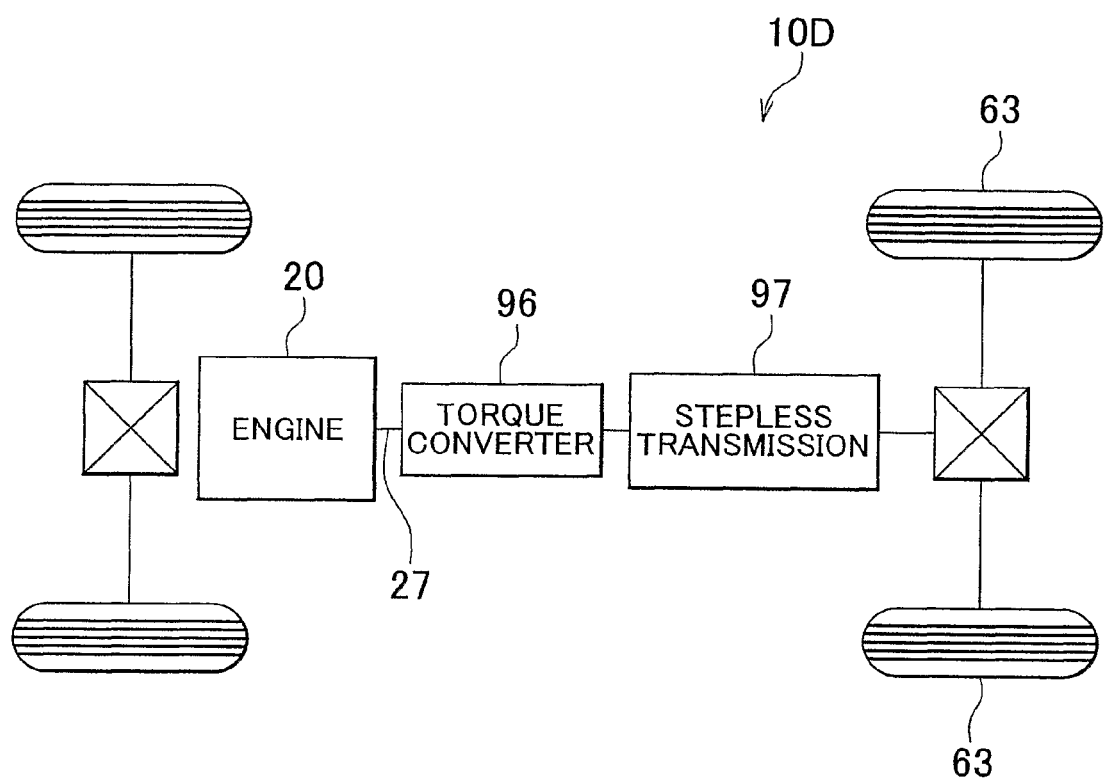
FIG. 10 shows an outline of the structure of yet another hybrid vehicle.

Moreover, in the above embodiment, the hybrid vehicle 10 combines features of both series and parallel hybrid systems. However, the invention may be applied to a vehicle that is purely a series hybrid or a parallel hybrid. Further, so long as the required driving force is set according to the accelerator opening degree Acc and the vehicle speed V, the invention may be applied to any type of vehicle, such as, for example, the automobile 10D shown in FIG. 10 in which a stepless transmission 97 (e.g., a CVT or a toroidal transmission) is connected to the crank shaft 27 that is the output shaft of the engine 20 via a torque converter 96. Alternatively, the invention may be applied to an electric vehicle including a battery that stores electric power, and a motor that converts electric power supplied from the battery to mechanical power and outputs this power to a drive shaft. Moreover, the invention may also be utilized in a fuel cell hybrid vehicle that includes (i) a fuel cell (for example, a solid polymer electrolyte fuel cell) in which a fuel gas, namely, hydrogen, is reacted with an oxidizing gas, namely, air, to generate electric power, (ii) a battery that stores the electric power, and (iii) a motor that converts the electric power supplied from the battery to mechanical power and outputs it to a drive shaft.

The invention claimed is:

1. A power output device that outputs driving force from a power source to a drive shaft, comprising:
   an accelerator opening degree detector that detects an accelerator opening degree of an accelerator operated by a driver;
   a vehicle speed detector that detects a present vehicle speed;
   a controller that sets a required driving force when the driver requests increased driving force as determined based on the accelerator opening degree detected by the accelerator opening degree detector, by deriving a future vehicle speed at the time of the request for increased driving force, sets the required driving force based on the derived future vehicle speed at the time of the request for increased driving force, the present accelerator opening degree, and the present vehicle speed, and controls the power source based on the set required driving force.

2. The power output device according to claim 1, wherein when the required driving force is set, the controller sets the required driving force using a three-dimensional relationship of the accelerator opening degree, the present vehicle speed, and the required driving force, the three-dimensional relationship corresponding to the derived future vehicle speed at the time of the request for increased driving force.

3. The power output device according to claim 2, wherein when there is a request for increased driving force, the controller switches from a presently used three-dimensional relationship to the three-dimensional relationship corresponding to the derived future vehicle speed at the time of the request for increased driving force.

4. The power output device according to claim 1, wherein the controller determines that the driver requests increased driving force when a change amount of the accelerator opening degree is equal to or more than a predetermined setting requirement change amount.

5. The power output device according to claim 1, wherein the controller determines that the driver requests increased driving force when the accelerator opening degree increases from substantially zero.

6. The power output device according to claim 1, wherein when the required driving force is set, the controller sets the required driving force to be larger with respect to the same accelerator opening degree when the present vehicle speed is low when there is a request for increased driving force, as compared to when the present vehicle speed is high when there is a request for increased driving force.

7. The power output device according to claim 1, wherein when the required driving force is set, the controller sets the required driving force such that, if the present vehicle speed is high when there is a request for increased driving force, the required driving force changes less with respect to a change amount of the accelerator opening degree in a high speed region.

8. The power output device according to claim 1, wherein when the required driving force is set, the controller sets the required driving force such that, if the present vehicle speed is high when there is a request for increased driving force as compared to when the present vehicle speed is low when there is a request for increased driving force, the required driving force is substantially constant with respect to the same accelerator opening degree in the high speed region.

9. The power output device according to claim 1, wherein the power source is an internal combustion engine that outputs power to an output shaft, and the power output device further comprises:
   a speed change/transmission device, connected to the output shaft, the rotational speed of the output shaft outputs power in accordance with change in a continuously variable gear ratio, and the speed change/transmission device transmits the power to the drive shaft of a vehicle wheel, wherein
   the controller controls the internal combustion engine and the speed change/transmission device based on the set required driving force.

10. The power output device according to claim 1, wherein the power source comprises a plurality of power sources, one of the plurality of power sources being an internal combustion engine that outputs power to a drive shaft, and another of the plurality of power sources being a motor that can selectively input power to the drive shaft and output power from the drive shaft, the power output device further comprises:
   a power input-output device, connected to an output shaft and the drive shaft of a vehicle wheel, that outputs at least a part of the power output from the internal combustion engine to the drive shaft, wherein
   the controller controls the internal combustion engine, the power input-output device and the motor based on the set required driving force.

11. The power output device according to claim 10, wherein the power input-output device includes:
   a three-shaft power transfer device, having three shafts that are connected to three respective output shafts that form the output shaft of the internal combustion engine, the drive shaft, and a third rotating shaft, and the three-shaft power transfer device selectively transfers power between any two of the three shafts and the remaining shaft such that the two shafts input power when the remaining shaft outputs power or the two shafts output power when the remaining shaft inputs power; and a generator that transfers power to/from the third rotating shaft, wherein the controller controls the internal combustion engine, the generator and the motor based on the set required driving force.

12. The power output device according to claim 10, wherein the power input-output device is a two-rotor motor provided with a first rotor connected to the output shaft of the internal combustion engine and a second rotor connected to the drive shaft, the two-rotor motor transferring electric power generated by the electromagnetic effect of the first rotor and the second rotor, and outputting at least a part of the power from the internal combustion engine to the drive shaft.

13. A vehicle equipped with the power output device according to claim 1.

14. A method for controlling a power output device that outputs driving force from a power source to a drive shaft, comprising:

determining whether a driver has requested increased driving force based on an accelerator opening degree, and when it is determined that the driver has requested increased driving force;

detecting a present vehicle speed;

deriving a future vehicle speed at the time of the request for increased driving force;

setting a required driving force based on the derived future vehicle speed at the time of the request for increased driving force, the present accelerator opening degree, and the present vehicle speed; and controlling the power source based on the set required driving force.

* * * * *